United States Patent [19]

McManus

[11] Patent Number: 5,268,607
[45] Date of Patent: Dec. 7, 1993

[54] MOLDED RESIN MOTOR HOUSING

[75] Inventor: Edward C. McManus, Rochester, N.Y.

[73] Assignee: Webster Plastics, Webster, N.Y.

[21] Appl. No.: 942,434

[22] Filed: Sep. 9, 1992

[51] Int. Cl.⁵ .......................... H02K 5/00; H02K 1/04
[52] U.S. Cl. ........................................ 310/89; 310/43; 310/45
[58] Field of Search .............. 310/89, 43, 45, 40 MM, 310/154, 58, 85, 98, 232, 235, 258

[56] References Cited

U.S. PATENT DOCUMENTS

| | | | |
|---|---|---|---|
| 3,444,402 | 5/1969 | Cartier | 310/43 |
| 3,789,250 | 1/1974 | Macoit et al. | 310/154 |
| 3,932,929 | 1/1976 | Hallerback et al. | 310/43 X |
| 4,412,146 | 10/1983 | Fütterer et al. | 310/43 X |
| 4,414,481 | 11/1983 | de Jong | 310/89 X |
| 4,508,988 | 4/1985 | Reiss et al. | 310/154 |
| 4,572,979 | 2/1986 | Haar et al. | 310/43 X |
| 4,593,222 | 6/1986 | Burkel et al. | 310/254 |
| 4,910,861 | 3/1990 | Dohogne | 310/43 X |
| 4,931,681 | 6/1990 | Spaggiari | 310/89 |
| 4,954,736 | 9/1990 | Kawamoto et al. | 310/43 X |
| 4,982,125 | 1/1991 | Shirakawa | 310/89 X |
| 5,073,738 | 12/1991 | Tang | 310/89 X |

Primary Examiner—R. Skudy
Assistant Examiner—E. To
Attorney, Agent, or Firm—Eugene Stephens & Associates

[57] ABSTRACT

An electric motor assembly for housing assembly (10) for electromechanical drives in automobiles is injection molded from a resin material. An armature bearing (18), mounting holes (30), and a flux ring (38) are molded in place within a housing (12) so that inner cylindrical surfaces (20 and 40) of the armature bearing and flux ring are centered with respect to the mounting holes (30) along a central axis (34). Protrusions (52 and 52) are molded through openings in the flux ring (38) for holding permanent magnets (44 and 46) in place against the flux ring.

19 Claims, 4 Drawing Sheets

MOLDED RESIN MOTOR HOUSING

TECHNICAL FIELD

My invention relates to small electric motors having cup-shaped housings and, in particular, to direct current (DC) motors with permanent magnets and of the type used to power auxiliary systems in automobiles.

BACKGROUND OF INVENTION

Small electric motors are used for many purposes in automobiles. For example, a fully equipped automobile includes individual motors for powering each windshield wiper system, fan, and window lift system and three additional motors for powering each adjustable seat. Electric motors are also used as sunroof, mirror, and antenna drives.

Ordinarily, these motors have metal housings that are formed from drawn steel cans. C-shaped permanent magnets are attached to the sides of the can with adhesives, clips, or screws that are tapped into the magnets. The steel body of the can functions as a flux ring surrounding the magnets. A self-centering bearing is mounted at a closed end of the can. One end of an armature shaft is journaled in the bearing, and the armature shaft can be tilted with the bearing into alignment with another bearing carried in a housing cover.

The drawn steel cans are expensive and add considerable weight to the motors. The self-centering bearings also add cost and require additional clearance between the armature and the permanent magnets to align the armature shaft between the bearings. The additional clearance detracts from motor performance.

SUMMARY OF THE INVENTION

My new electric motor housing assembly overcomes problems with prior drawn steel housings by replacing the steel housings with resin housings and feromagnetic flux rings. The resin material weighs much less than the steel and can be more easily formed to a desired shape. The flux rings are also much easier to form. In addition, armature bearings and magnet mounts can be molded in desired positions within the housing.

One example of my motor housing assembly includes a cup-shaped housing that is injection molded from a resin material. A flux ring is molded in place within a center portion of the housing; an armature bearing is molded in place within a closed end of the housing; and alignment elements for mounting a housing cover are molded in place within an open end of the housing. Also, protrusions are molded through openings in the flux ring for holding permanent magnets in place against the flux ring.

Inner cylindrical surfaces of both the flux ring and the armature bearing are centered within the housing with respect to alignment elements. This helps to reduce runout of a motor armature and assures a precise positional relationship between the armature and the magnets. Motor performance is improved by reducing an amount of clearance space between the armature and the magnets.

DRAWINGS

DETAILED DESCRIPTION

Figure 1:
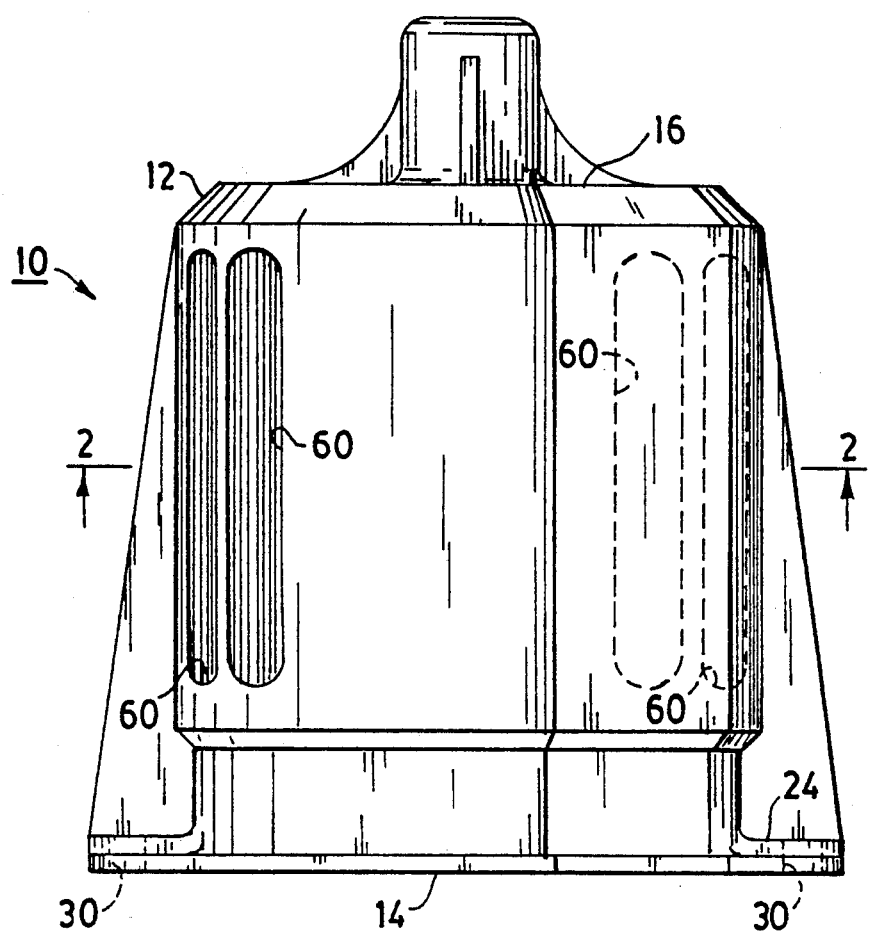
FIG. 1 is an perspective view of my new motor housing assembly.
Figure 2:
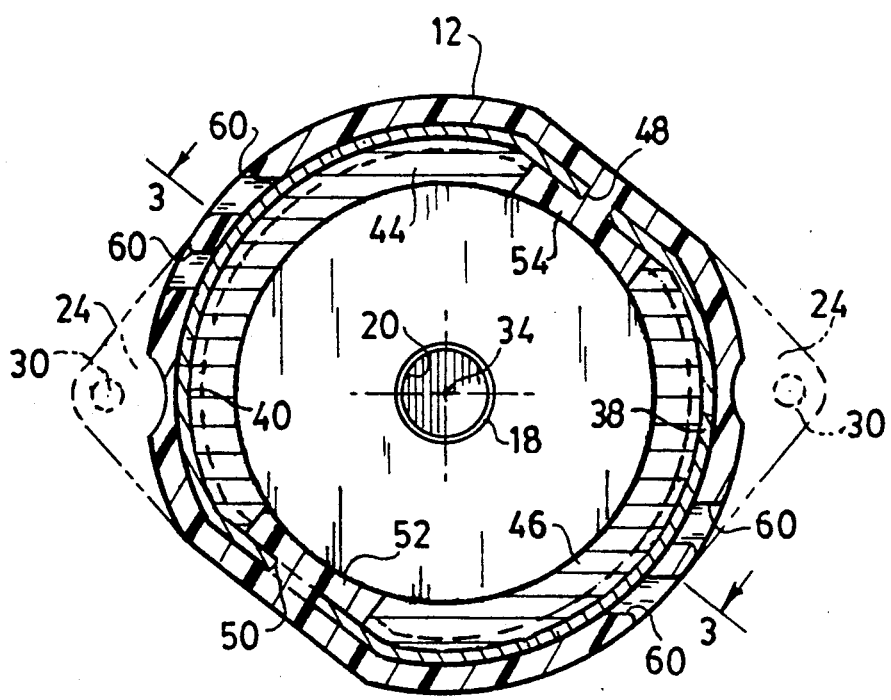
FIG. 2 is a cross-sectional end view of the same assembly along line 2—2 of FIG. 1 also showing flange portions in phantom line.
Figure 3:
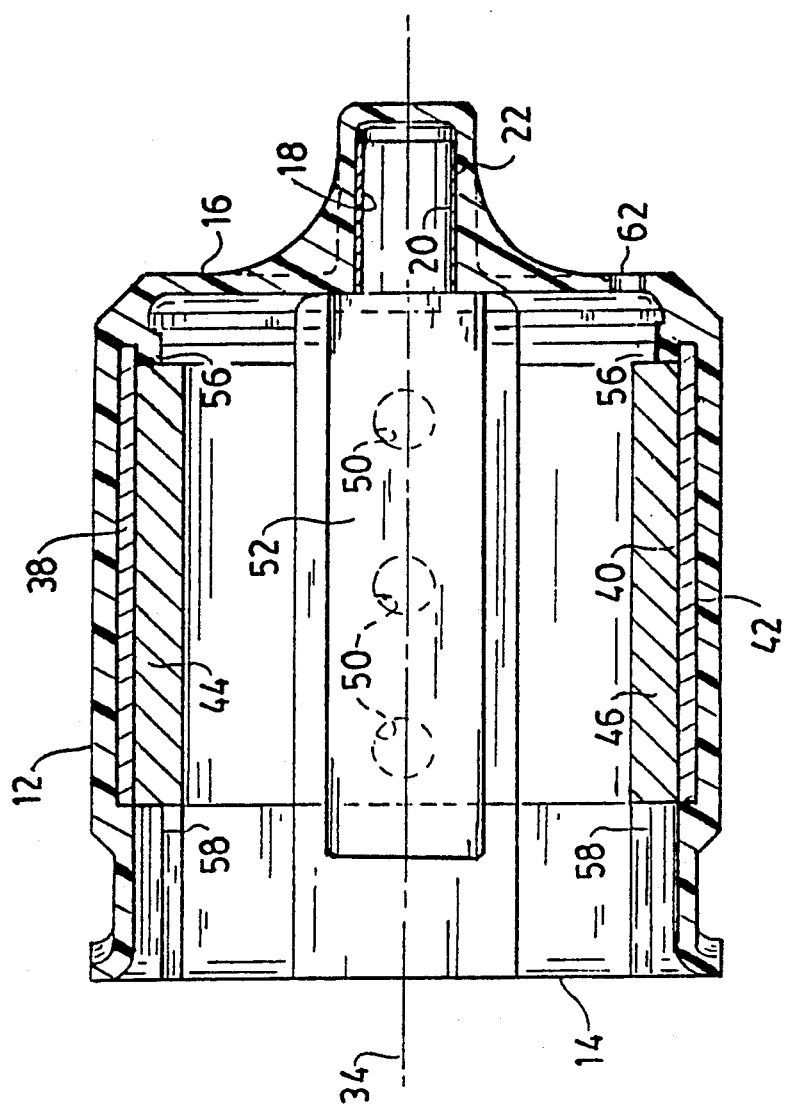
FIG. 3 is a cross-sectional view of the assembly taken along line 3—3 of FIG. 2.

A windshield wiper motor housing assembly 10 is illustrated in FIGS. 1 through 3 as a preferred embodiment of my invention. The assembly 10 includes a cup-shaped housing 12 having an open end 14 and a closed end 16. The housing 12 is molded of a resin material such as AMODEL A-1565 HS NT from Amoco Performance Products, Inc. of Atlanta, Ga. The preferred resin is a sixty-five percent glass and mineral reinforced polyphthalamide that exhibits high stiffness and good dimensional stability at elevated temperatures.

An armature bearing 18 in the form of a thin sleeve having inner and outer cylindrical surfaces 20 and 22 is molded in place within the closed end 16 of the housing. The armature bearing 18 is also preferably made of a resin material such as TORLON 4203L from the same manufacturer. The preferred resin material of the armature bearing 18 is a polyamide-imide that exhibits high strength and wear resistance at elevated temperatures, low friction, and a higher melting point than the resin material of the housing 12 to permit the armature bearing to be molded in place within the housing.

Figure 4:
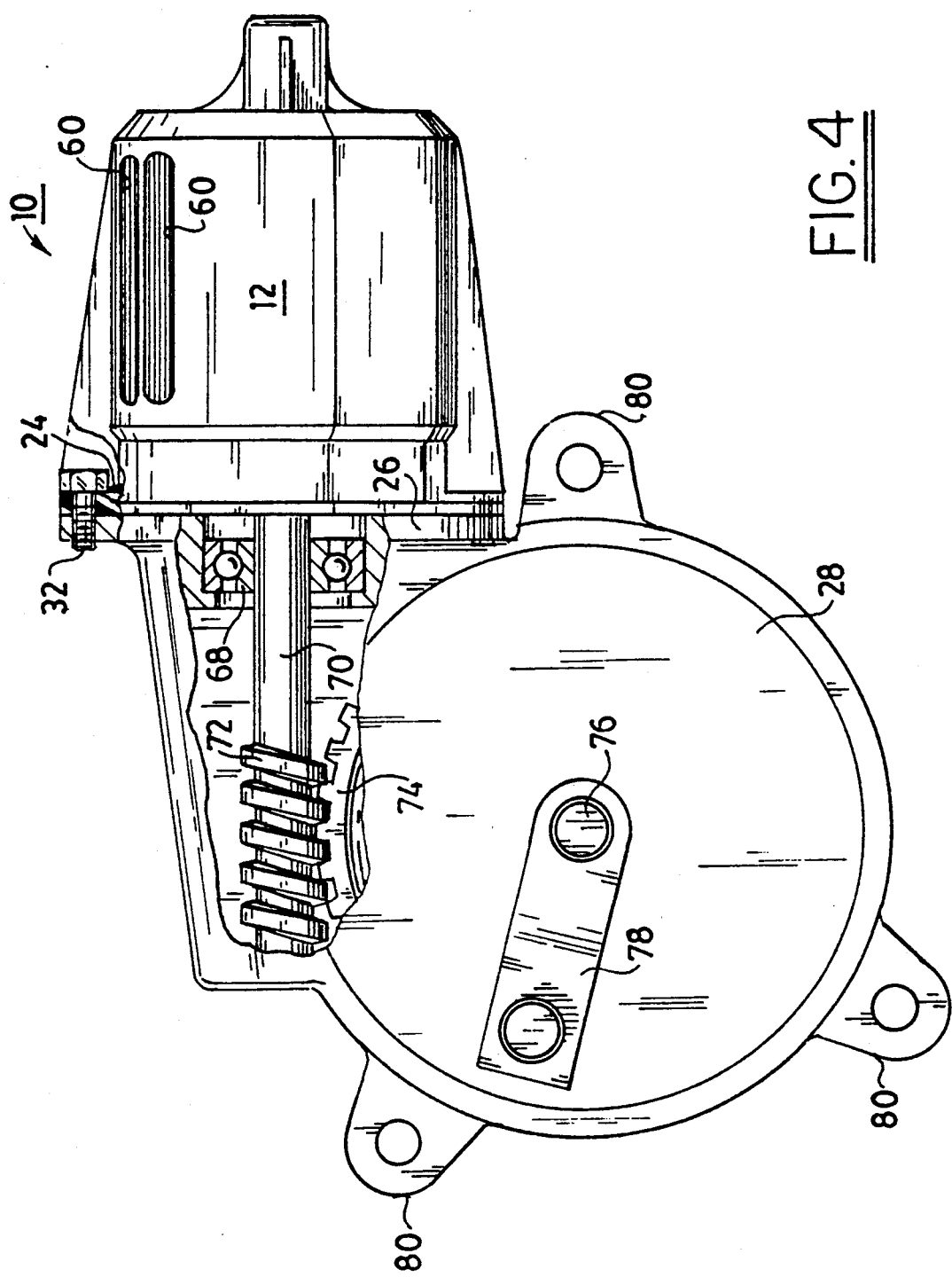
FIG. 4 is a partly cut-away view of the assembly attached to a windshield wiper drive casting.

A flange 24 is molded at the open end 14 of the housing for mounting the housing assembly 10 on a cover portion 26 of a wiper drive casting 28 shown in FIG. 4. Mounting holes 30 are formed through the flange 24 for aligning the housing assembly 10 with similar mounting holes formed in the cover portion 26. Fasteners 32 in the form of screws or rivets extend through the mounting holes in the flange 24 and cover portion 26 for attaching the housing assembly 10 to the wiper drive casting 28.

Both the mounting holes 30 and the inner cylindrical surface 20 of the armature bearing are molded within the housing 12 in positions that are centered with respect to a central axis 34. This eliminates the need for angularly adjusting the armature bearing into alignment with the central axis.

A steel flux ring 38 also having inner and outer cylindrical surfaces 40 and 42 is mounted in place within the housing 12. Preferably, the flux ring 38 is molded in place in a position that also centers the inner cylindrical surface 40 of the flux ring with respect to the central axis 34. The inner cylindrical surface 40 of the flux ring provides a mounting surface for locating a pair of permanent magnets 44 and 46 within the housing assembly 10. Since the inner cylindrical surfaces 20 and 40 of the armature bearing and flux ring can be mounted independent of any diametral variations of their respective outer cylindrical surfaces 22 and 42, a gap between an armature coil (not shown) and the permanent magnets 44 and 46 can be reduced for improving motor performance.

A slot 48 is formed through the periphery of the flux ring 38 to provide some mounting flexibiliy for molding the flux ring within the housing 12. A series of apertures 50 are also formed through the flux ring in positions diametrically opposed to the slot 48. Respective protrusions 52 and 54 are molded through the slot 48 and the apertures 50 for holding the magnets 44 and 46 in place against the flux ring 38. The magnets 44 and 46 can be inserted between the protrusions 52 and 54 through the open end 14 of the housing.

The protrusions 52 and 54 are shaped to grip opposite sides of the magnets 44 and 46 similar to a dovetail fastener for press fitting the magnets against the flux ring 38. Molded stop lands 56 hold the magnets 44 and 46 in place against movement toward the closed end 16 of the housing. The flux ring 38 is also made with tabs 58 that can be folded against ends of the magnets 44 and 46 for preventing movement of the magnets toward the open end 14 of the housing. Alternatively, the protrusions could be formed with tapers to secure the magnets against such movement with an interference fit.

Openings 60 are formed through an exterior surface of the housing 12 for exposing the outer cylindrical surface 22 of the flux ring to atmosphere. Any excess heat retained in the flux ring is dissipated to the atmosphere through the openings 60. A vent 62 permits air circulation between an interior of the housing 12 and the atmosphere.

The motor housing assembly 10 of FIGS. 1 through 3 is connected in FIG. 4 to the wiper drive casting 28. A second armature bearing 68 is mounted in the casting 28 for rotatively supporting an armature shaft 70 that extends through the cover portion 26. The two armature bearings 18 and 68 are aligned with each other and the central axis 34 by the fasteners 34. A worm gear 72 is fashioned at the end of the armature shaft 70 for driving a worm wheel 74. A shaft 76 driven by the worm wheel 74 rotates a crank arm 78 of a wiper linkage mechanism (not shown). Brackets 80 mount the wiper drive casting 28 in a vehicle.

Figure 5:
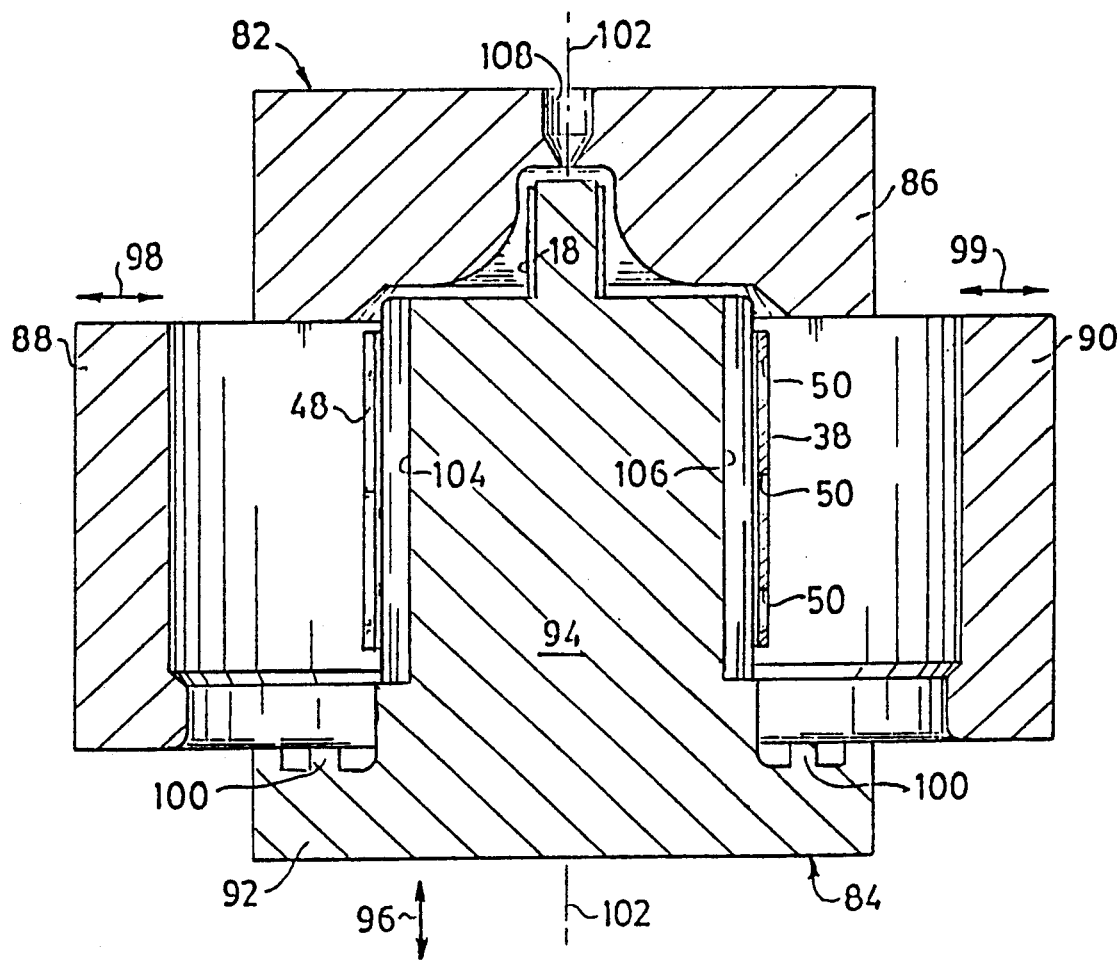
FIG. 5 is a simplified cross-sectional view through an injection mold for making the assembly.

The housing 12 is preferably injection molded within a mold cavity formed by mold parts such as those shown in FIG. 5. The mold includes top and bottom halves 82 and 84. The top half 82 includes a machined portion 86 that forms the closed end 16 of the housing and two slide portions 88 and 90 that form the housing periphery. The bottom half 84 of the mold includes a machined portion 92 that forms the open end 14 of the housing and a core portion 94 that forms the housing interior.

The top and bottom mold halves 82 and 84 are relatively movable in the directions indicated by arrow 96, and the two slide portions 88 and 90 are relatively movable in the directions indicated by arrows 98 and 99 for exposing the core portion 94. The armature bearing 18 is mounted on a small diameter section of the core portion 94, and the flux ring 38 is mounted on a concentric large diameter section of the core portion 94. The machined portion 92 of the bottom mold half includes posts 100 for forming the mounting holes 30 in positions that are centered with respect to a central axis 102, which is also the central axis of the core portion 94. Accordingly, the inner cylindrical surfaces 20 and 40 of the armature bearing and flux ring, as well as the mounting holes 30 of the flange, are centered with respect to each other within the bottom mold half 84.

Recesses 104 and 106 in the core portion 94 form the protrusions 52 and 54. Slot 48 and apertures 50 permit resin to flow through the flux ring 38 into the recesses 104 and 106 for forming the protrusions 52 and 54. Projections (not shown) on the slide portions 88 and 90 form openings in the housing for exposing portions of the flux ring to atmosphere.

A sprue 108 in the machined portion 86 of the top mold half provides an opening for injecting fiber-filled resin material into the mold. The sprue is aligned with an end of the core portion 94 to introduce turbulence within the resin for better distributing the fibers throughout the mold. After the resin has sufficiently cooled, the slide portions 88 and 90 are opened and the top and bottom mold halves 82 and 84 are separated for removing the molded housing assembly 10 from the core portion 94.

Although my invention has been described for use in a windshield wiper motor, my invention can also be used to provide an improved motor housing assembly for other automotive systems as well as other types of systems that are adaptable for similar improvements.

I claim:

1. An electric motor housing assembly comprising:
   a molded motor housing having a central axis and open and closed ends;
   a flux ring having an inner cylindrical surface and an outer surface and being molded in place within said housing;
   an armature bearing having an inner cylindrical surface and an outer surface and being molded in place within said closed end of the housing;
   alignment elements for mounting a cover being molded in place at said open end of the housing;
   said inner cylindrical surfaces of the flux ring and the armature bearing being molded within said housing in positions defined by different portions of a single mold core parts; and
   said inner cylindrical surfaces of the flux ring and the armature bearing, together with said alignment elements, being molded within said housing in positions that are centered with respect to said central axis independently of said outer surfaces of the flux ring and the armature bearing.

2. The assembly of claim 1 further comprising:
   openings formed through said flux ring between said inner and outer surfaces of the flux ring;
   said motor housing including protrusions molded through said openings in the flux ring; and
   said protrusions being shaped for securing said flux ring to said motor housing and for holding magnets in place against said flux ring.

3. The assembly of claim 2 in which said protrusions are molded as fasteners for press fitting the magnets in place against said flux ring.

4. The assembly of claim 3 in which said flux ring includes tabs that can be folded against ends of the magnets for holding the magnets in place against movement toward said open end of the housing.

5. The assembly of claim 2 in which a flange is molded at said open end of the housing and said alignment elements are holes formed through said flange.

6. The assembly of claim 2 in which said housing is molded from a first resin material.

7. The assembly of claim 6 in which said housing includes an exterior surface and openings molded in said housing for exposing said flux ring within said exterior surface.

8. The assembly of claim 6 in which said armature bearing is made from a second resin material having a melting temperature above that of the first resin material.

9. The assembly of claim 8 in which said first resin material is a polyphthalamide.

10. The assembly of claim 8 in which said second resin material is a polyamide-imide.

11. A housing for an electric motor comprising:
a main body molded from a resin material;
a magnetic flux ring molded in place within said main body;
said magnetic flux ring having an inner cylindrical surface and an outer surface that is contiguous with said main body;
openings formed through said magnetic flux ring between said inner and outer surfaces of the flux ring;
said main body of said resin material including protrusions molded through said openings in said flux ring; and
said protrusions being shaped for securing said flux ring to said main body and for holding magnets in place against said flux ring.

12. The housing of claim 11 in which said protrusions are molded as fasteners for press fitting the magnets against said flux ring.

13. The housing of claim 11 in which said main body includes a central axis and is molded with an open end and a closed end.

14. The housing of claim 13 in which said main body is molded with stop lands for holding the magnets in place against movement toward said closed end of the main body.

15. The housing of claim 14 in which said flux ring includes tabs that can be folded against ends of the magnets for holding the magnets in place against movement toward said open end of the main body.

16. The housing of claim 13 further comprising an armature bearing having an inner cylindrical surface and an outer surface and being molded in place within said closed end of the main body.

17. The housing of claim 16 in which said inner cylindrical surfaces of the flux ring and the armature bearing are molded within said main body in positions defined by different portions of a single old core part.

18. The housing of claim 16 further comprising alignment elements for mounting a cover being molded in place at said open end of the main body.

19. The housing of claim 18 in which said inner cylindrical surfaces of the flux ring and armature bearing, together with said alignment elements, are centered in the main body with respect to said central axis independently of said outer surfaces of the flux ring and the armature bearing.

* * * * *